United States Patent [19]

Shen et al.

[11] Patent Number: 5,646,805
[45] Date of Patent: Jul. 8, 1997

[54] MAGNETORESISTIVE READ TRANSDUCER WITH PARTIALLY ABUTTED JUNCTIONS

[75] Inventors: Yong Shen, Milpitas; Steven Clark Rudy, San Jose, both of Calif.

[73] Assignee: Read-Rite Corporation, Milpitas, Calif.

[21] Appl. No.: 711,301

[22] Filed: Sep. 3, 1996

Related U.S. Application Data

[63] Continuation of Ser. No. 399,424, Mar. 6, 1995, abandoned.

[51] Int. Cl.$^6$ .................................. G11B 5/127; G11B 5/33
[52] U.S. Cl. .................................. 360/113; 324/252
[58] Field of Search .................. 360/113; 338/32 R; 324/252

[56] References Cited

U.S. PATENT DOCUMENTS

| | | | |
|---|---|---|---|
| 4,663,685 | 5/1987 | Tsang | 360/113 |
| 5,018,037 | 5/1991 | Krounbi et al. | 360/113 |
| 5,438,470 | 8/1995 | Ravipati et al. | 360/113 |

*Primary Examiner*—Stuart S. Levy
*Assistant Examiner*—Adriana Giordana
*Attorney, Agent, or Firm*—Nathan N. Kallman

[57] ABSTRACT

A magnetoresistive transducer is formed with a trilayer structure including a soft adjacent magnetic layer (SAL), a spacer layer and a magnetoresistive (MR) sensor element. The SAL and part of the spacer layer extend continuously across the transducer structure. The MR sensor element has end portions that partially abut hard permanent magnetic (PM) films and partially abut conductive leads formed over the PM films. The transducer structure minimizes the problem of electrical shorting and achieves significant improvements in magnetic performance of the active MR region and signal readout.

7 Claims, 2 Drawing Sheets

PRIOR ART

MAGNETORESISTIVE READ TRANSDUCER WITH PARTIALLY ABUTTED JUNCTIONS

This application is a continuation application Ser. No. 08/399,424, filed Mar. 6, 1995, abandoned.

CROSS-REFERENCE TO COPENDING APPLICATION

Copending U.S. patent application Ser. No. 08/312,537 filed Sep. 26, 1994 and assigned to the same assignee discloses a magnetoresistive (MR) head with a plurality of hard permanent magnetic (PM) bias layers deposited at the end regions of the MR layer to provide longitudinal bias. The aforementioned application is incorporated herein by reference.

FIELD OF THE INVENTION

This invention relates to magnetoresistive (MR) sensors and in particular to an MR read transducer assembly formed with partially abutted junctions between an MR sensor layer and permanent magnetic (PM) hard bias layers.

DESCRIPTION OF THE PRIOR ART

Inductive write heads are used for recording information on magnetic media, such as magnetic disks. The recorded information can be read out by an inductive read/write head. Alternatively, MR sensors can be used for sensing signals which have been recorded on a magnetic medium. The signal sensed by an MR head is proportional to the magnetic flux associated with the recorded signal, and not to the rate of change of flux which is sensed by an inductive head. Thus an MR head can detect a magnetic field representing a recorded signal independent of speed of the relative motion between the storage medium and the MR head.

A typical thin film MR head incorporates a single MR element, typically made of a layer of Permalloy having an easy axis of magnetization. During operation of a data storage apparatus, such as a disk drive, a sense current is directed to the MR element. The magnetic field being sensed exerts a torque on the magnetic moment in the MR thin film and roates the magnetization with resepect to the sensing current, thereby causing a change in the resistivity of the film. The resistivity is proportional to the strength of the field being detected. Detection of such variations provides a readout signal related to the data signal recorded on the magnetic medium.

When operating MR transducers, it is necessary to provide a proper transverse bias field in the MR active region to achieve linear response and high sensitivity. Also a longitudinal bias field is typically provided to suppress Barkhausen noise caused by irregular motion of domain walls.

Some prior art transducers incorporate an MR trilayer structure that includes an MR sensing layer and a soft magnetic adjacent layer (SAL) which are separated by a spacer layer. An MR transducer of this type using a trilayer structure is shown in U.S. Pat. No. 5,018,037. The patented transducer has four junctions to which current must flow. When forming the junctions, the MR film is overmilled to remove a portion of the first read gap. In the patented device, overetching of the first read gap is required to define the MR stripe or layer. There is a relatively small separation or gap between the conductive leads and the first magnetic shield and further removal of this gap may increase susceptibility to electrical shorting and result in decreased production yield. In the patented device, it is difficult to form junctions with both good electrical contact and optimum magnetic performance. Thus a compromise must be made between good electrical contact and optimum magnetic performance.

SUMMARY OF THE INVENTION

An object of the invention is to provide an MR transducer having an improved magnetic bias for Barkhausen noise suppression and which yields high signal-to-noise output.

Another object of this invention is to provide a magnetic transducer with more uniformity in profile thickness for realizing better step coverage for the deposited layers and a more linearized inductive write pole.

A further object is to provide an MR transducer with an increased manufacturing yield and improved reliability.

In accordance with this invention, an MR transducer comprises an MR layer having end portions spaced by a central active portion. Hard bias PM layers are formed with partially abutting junctions at the active region of the MR sensor layer to provide longitudinal bias. The magnetic flux required for maintaining the MR layer in a single domain state is provided by the permanent magnetic bias layers. A transverse field is provided by a soft adjacent layer (SAL) that is separated from the MR layer by a spacer layer. The MR layer, spacer layer and SAL form a trilayer structure. Conductive leads are connected to the MR layer and are formed over the hard permanent magnetic films of the MR trilayer structure.

BRIEF DESCRIPTION OF THE DRAWINGS

The invention will be described in greater detail with reference to the drawings in which:

FIG. 4 is a cross-sectional view, partially broken away, of an alternative structure of the MR transducer of this invention.

DETAILED DESCRIPTION OF THE INVENTION

Figure 1:
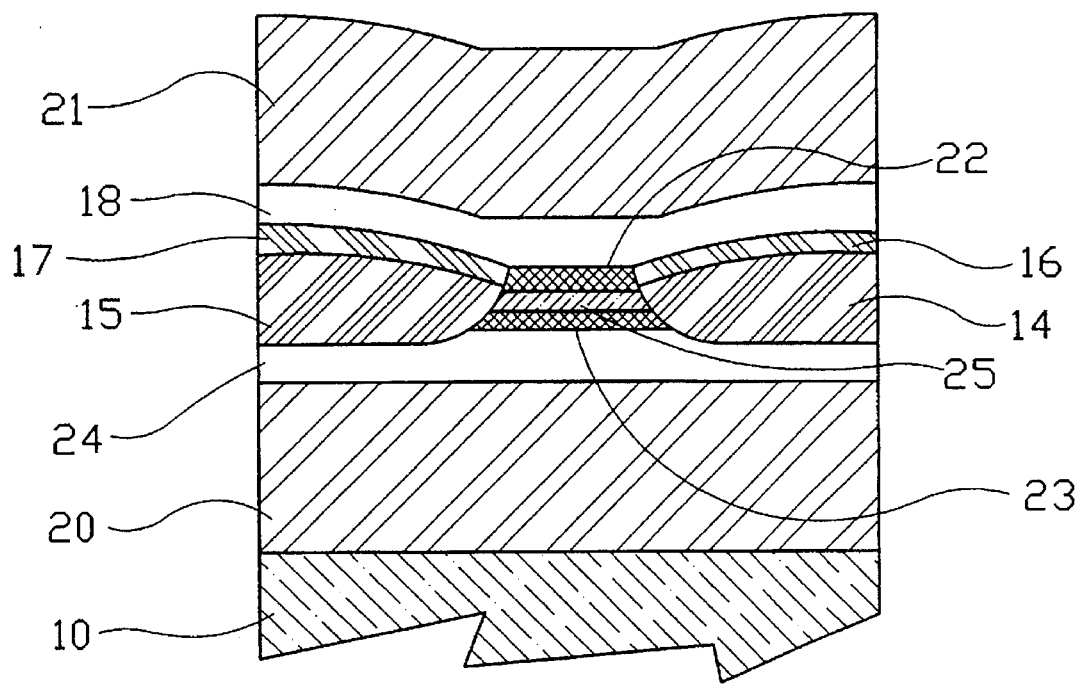
FIG. 1 is a cross-sectional view, partially broken away, of one type of prior art MR transducer.

FIG. 1 is a cross-sectional view of an embodiment of a prior art MR transducer taken along a plane parallel to the air bearing surface (ABS) of the device. The MR transducer is formed on a substrate 10 made of alumina-titanium carbide or silicon carbide, by way of example, on which a first magnetic shield 20 is deposited. An insulating layer 24 is formed over the shield 20 to define a first read gap. The MR transducer comprises a trilayer structure formed with a spacer layer 25 sandwiched between an MR layer 22 and a soft magnetic adjacent layer (SAL) 23. The MR layer 22 is normally made of a soft magnetic material, such as Permalloy, which is an alloy of nickel and iron, having a high permeability and a low coercive force. During the read process, changes in magnetic flux passing through the MR layer 22 cause corresponding variations in the resistivity of the MR layer 22. As is well-known in the art, the MR layer 22 must be aligned in a single domain state to suppress Barkhausen noise. Hard magnetic layers 14 and 15 disposed at the end portions of the trilayer structure provide a longitudinal magnetic bias for magnetic domain alignment. For MR layer 22 to operate within a linear region, transverse magnetic bias is applied to MR layer 22. The SAL 23 carries out this function by providing the transverse magnetic bias. A second insulating layer forming a second read gap 18 is deposited over conductive leads 16 and 17. A second magnetic shield 21 is formed over the second read gap 18.

Hard magnetic layers 14 and 15 are permanently magnetized and are disposed in direct contact with the end portions of the MR layer 22. Hard magnetic layers 14 and 15 supply the longitudinal magnetic bias to MR layer 22 through magnetic coupling. The SAL 23, generally made of a soft magnetic material having a high permeability, a low coercive force and a high resistivity, shunts a fraction of the bias current applied across electrical leads 16 and 17 during normal operations. The shunted current induces a magnetic flux which traverses the MR layer 22 as the transverse magnetic bias.

In the prior art design illustrated in FIG. 1, a fully abutted junction is disposed between the permanent magnetic films and the trilayer structure including the MR sensor, spacer layer and SAL. With this design, a vertical interface is desired for good magnetic performance, but a tapered interface is preferred for good electrical contact. A compromise must be made to achieve these desired objectives which makes process control of forming the junctions between the MR sensor and PM films difficult to implement. In addition overetching of the gap occurs during the definition of the MR active region. A reduced gap between the PM films and the shields results in a decreased yield due to electrical shorting found in the MR devices.

Figure 2:
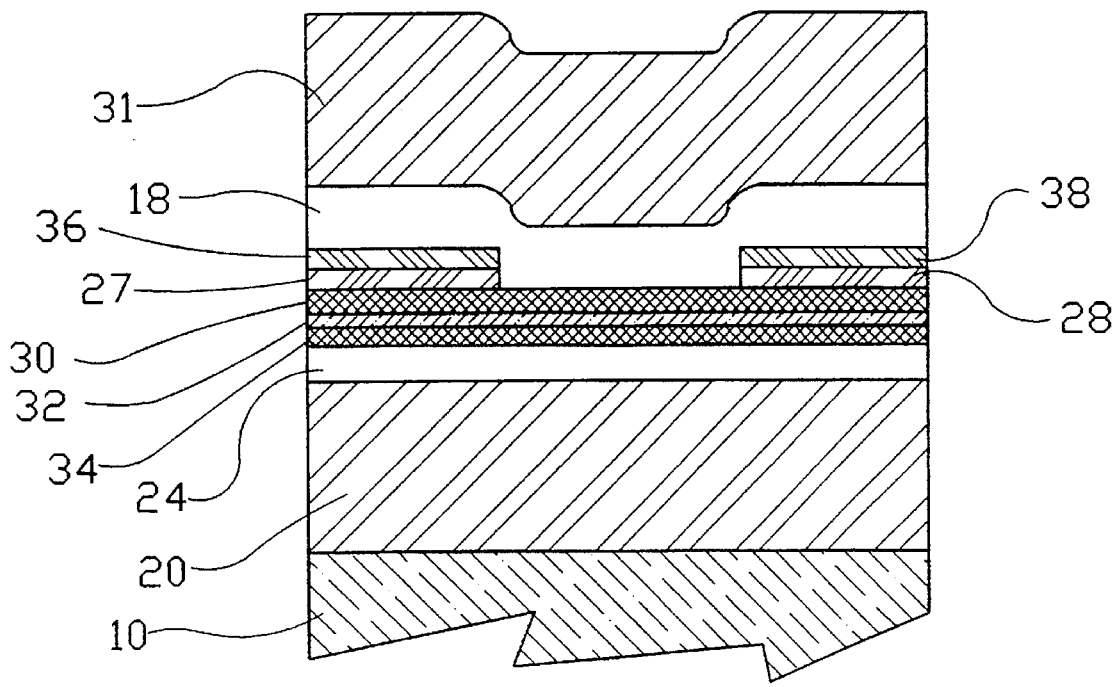
FIG. 2 is a cross-sectional view, partially broken away, of another design of a prior art MR transducer.

To improve the longitudinal magnetic bias, a different type of transducer is described in U.S. Pat. No. 4,663,685. FIG. 2 of the instant application shows such a prior art transducer having a substrate 10, a first shield 20, a first read gap 24, and a trilayer structure including an MR sensor 30, spacer 32 and SAL 34. The trilayer structure extends over the entire transducer and exchange antiferromagnetic magnetic layers 27, 28 are formed at the end regions of the trilayer. The part of the MR film 30 having high permeability and a large MR coefficient under the exchange layers 27, 28 can cause side-reading and read-track broadening. Another disadvantage of this design is difficulty in forming the second read gap 18 with good step coverage as electrical leads 36, 38 are formed at the top of exchange films 27, 28 which generate a relatively large step between leads 36, 38 and the MR active region. This large step also can require additional processing in order to form a linearized write pole.

Figure 3:
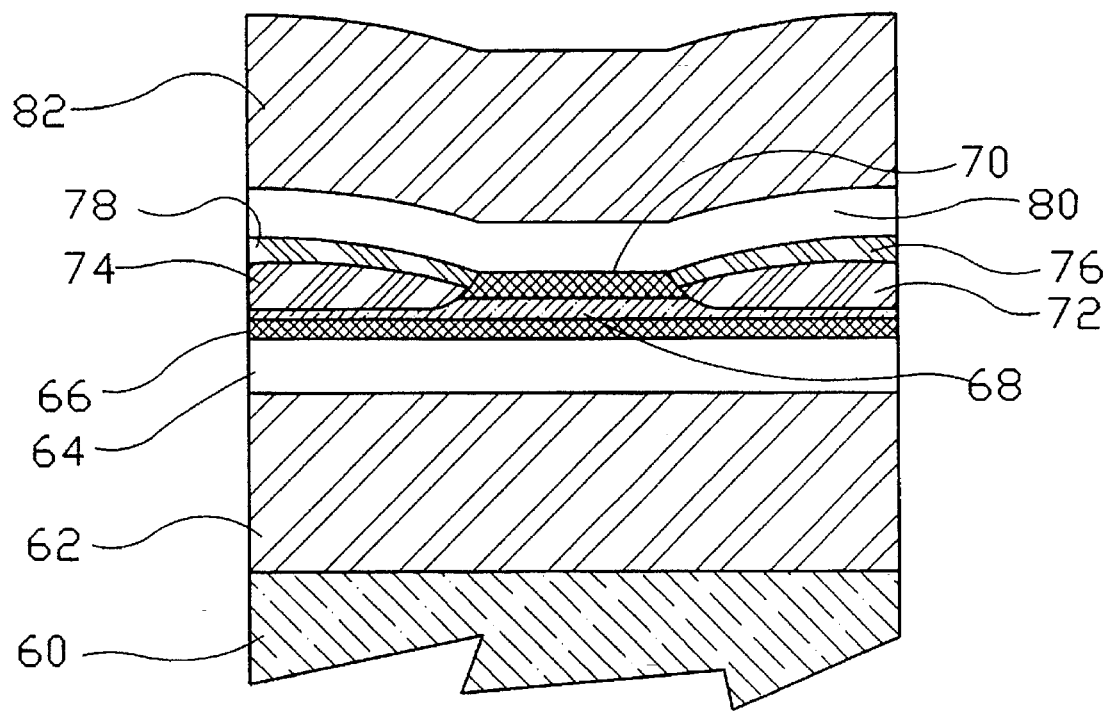
FIG. 3 is a cross-sectional view, partially broken away, of the novel MR transducer of this invention.

In accordance with this invention, an MR transducer depicted in FIG. 3 comprises a substrate 60, a first shield 62, a first read gap 64, a trilayer structure including SAL 66, spacer layer 68 and MR sensor layer 70. The SAL 66 and spacer layer 68 extend fully across the MR transducer body. Hard bias PM films 72 and 74 partially abut the ends of the MR sensor layer 70 to provide exchange coupling and a longitudinal bias field. Electrical leads 76 and 78 are connected to the MR sensor 70 above the PM films 72 and 74 to enable passing current between the sensor and external circuitry. A second read gap 80 is provided above the MR sensor layer 70 and a magnetic shield 82 is formed over the second read gap 80. The magnetic shields 62 and 82 are preferably made of a high permeability nickel-iron material, such as Permalloy, having a low coercive force. A transverse bias field is provided by the soft adjacent magnetic layer 66 whereas the longitudinal bias field is provided by PM films 72 and 74 in the MR transducer of this invention.

During production of the MR transducer, the MR trilayer which includes an MR layer 70, a spacer 68 and an SAL 66, is partially etched to define an active MR sensing region. In the partial etching process, the end portions of the MR sensing layer 70 is removed with end portions of the spacer 68 and an upper part of the end portions of SAL 66. The central portion of the SAL 66 remains at a higher level than the surrounding SAL material so that the PM hard bias layers 72 and 74 can form partial abutting junctions with the MR sensor 70. The hard bias layers and electrical leads are then deposited to form partially abutted junctions. The height of the MR stripe or sensor layer is then defined by etching.

By virtue of this invention, contact resistance is easily controlled and eliminated. Electrical contact relies mostly on the SAL and spacer structure. Process trimming conditions can be selected, without concern about electrical contact and shorting, to form the partially abutted junctions which achieve optimum magnetic performance of the active MR region. Improved transverse bias is provided without affecting the SAL 66 during etching and trimming of the MR sensor layer 70. Also, improved control of the maagnetization of the SAL, which provides transverse bias, is achieved. A thicker final first read gap between the electrical lead and shield is provided and an improved yield is realized due to minimization of electrical shorting. Also, there is no side reading component of the signal being sensed because the MR layer is completely removed from underneath the electrical lead.

What is claimed is:

1. A magnetoresistive transducer comprising:

a substrate;

a magnetic shield disposed on said substrate;

a first insulating layer disposed over said magnetic shield for providing a first read gap;

a trilayer structure including a continuous soft adjacent magnetic layer formed over said first insulating layer and coextensive therewith;

a continuous spacer layer having a central region and end regions and formed over said soft adjacent magnetic layer and coextensive therewith;

a magnetoresistive sensor element disposed only over said central region of said spacer layer and having ends;

hard permanent magnetic films formed entirely on said end regions of said spacer layer and formed adjacent to said ends of said magnetoresistive sensor element and abutting said ends to form junctions therewith, said hard permanent magnetic films being separated from said soft adjacent magnetic layer by said end regions of said spacer layer for providing magnetic coupling and a longitudinal bias field;

conductive leads deposited over said hard permanent magnetic films and abutting said ends of said magnetoresistive sensor element magnetic films; and a second insulating layer formed over said magnetoresistive element and over said conductor leads for providing a second read gap.

2. A magnetoresistive transducer as in claim 1, including a second magnetic shield disposed over said second read gap.

3. A magnetoresistive transducer as in claim 1 wherein each of said junctions comprises an arcuate profile.

4. A magnetoresistive transducer as in claim 1 wherein said central region of said spacer layer is thicker than said end regions.

5. A magnetoresistive transducer comprising:

a substrate;

a magnetic shield disposed on said substrate;

a first insulating layer disposed over said magnetic shield for providing a first read gap;

a trilayer structure including a continuous soft adjacent magnetic layer having a central region and ends and formed over said first insulating layer;

a spacer layer disposed over said central region of said soft adjacent magnetic layer and having ends;

a magnetoresistive sensor element formed over said spacer layer and having ends;

hard permanent magnetic films having lower surfaces over said ends of said soft adjacent layer and formed adjacent to said ends of said magnetoresistive sensor element and said spacer layer, and abutting said ends of said magnetoresistive sensor element to form junctions therewith, the entirety of said lower surfaces of said hard permanent magnetic films being disposed over and in contact with said ends of said spacer layer;

conductive leads deposited over said hard permanent magnetic films and abutting said ends of said magnetoresistive sensor element; and a second insulating layer formed over said magnetoresistive sensor element and over said conductive leads for providing a second read gap.

6. A magnetoresistive transducer as in claim 5, further comprising a second magnetic shield disposed over said second insulating layer.

7. A magnetoresistive transducer as in claim 5, wherein each of said junctions and said ends of said spacer layer comprises an arcuate profile.

* * * * *